William Hugh Clifton
INVENTOR.

BY Murray Robinson
ATTORNEY

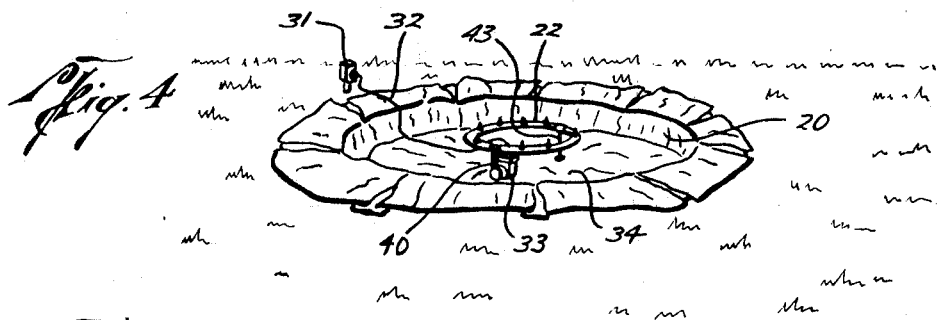
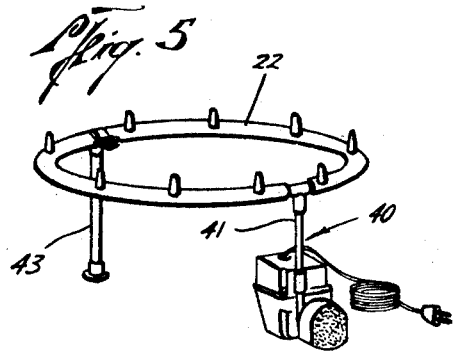
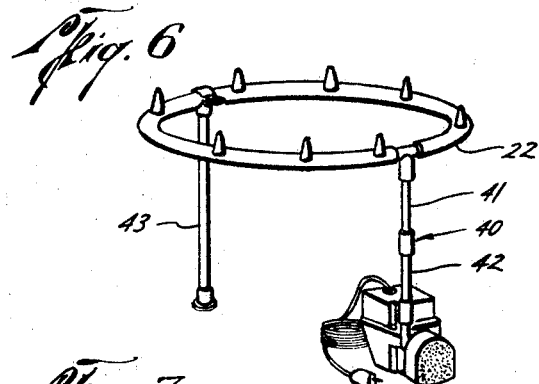
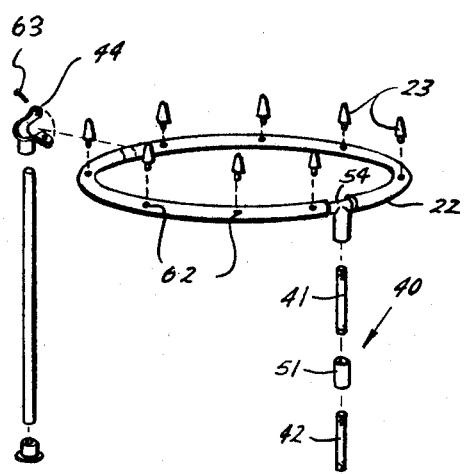
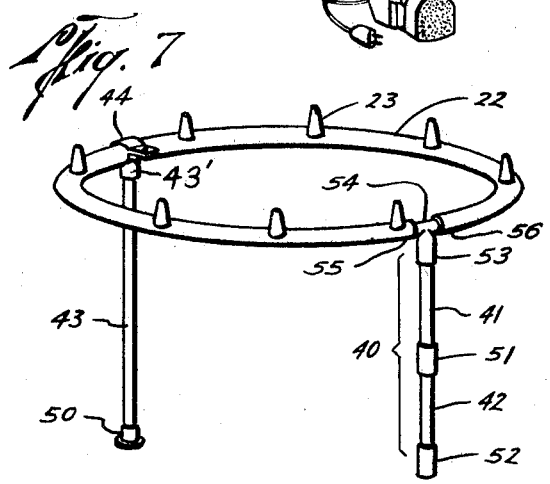

March 31, 1970   W. H. CLIFTON   3,503,554
FOUNTAIN DISPLAY APPARATUS
Filed Sept. 9, 1968   3 Sheets-Sheet 3
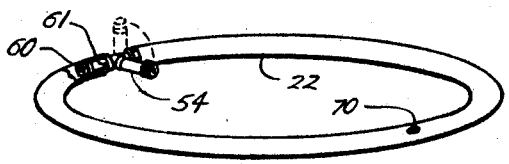
Fig. 9
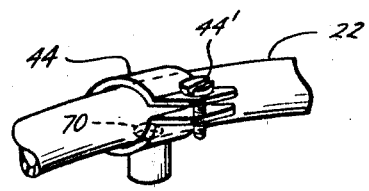
Fig. 10
Fig. 11
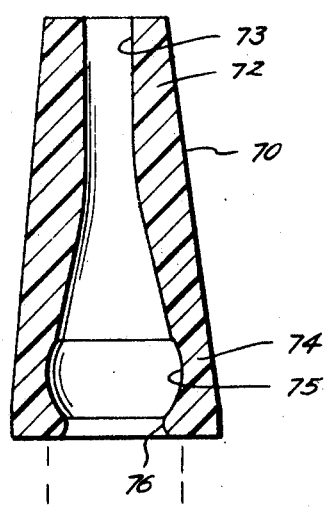
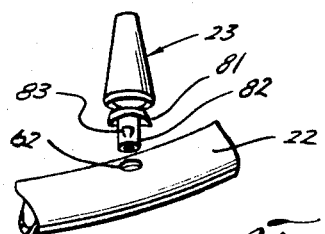
Fig. 12
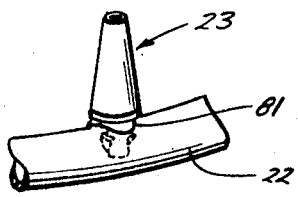
Fig. 13
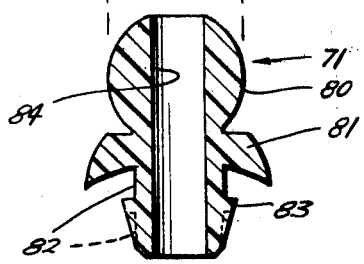
William Hugh Clifton
INVENTOR.
BY
Murray Robsman
ATTORNEY ID 3,503,554
Patented Mar. 31, 1970

United States Patent Office

3,503,554
FOUNTAIN DISPLAY APPARATUS
William Hugh Clifton, Oklahoma City, Okla., assignor to Little Giant Corporation, Oklahoma City, Okla., a corporation of Oklahoma
Filed Sept. 9, 1968, Ser. No. 758,285
Int. Cl. B05b 17/08
U.S. Cl. 239—23
5 Claims

ABSTRACT OF THE DISCLOSURE

A knockdown water fountain includes a centrifugal recirculating pump having a vertical outlet, an adjustable length flow conduit supported by and connected to the outlet and to a swivel T, an open plastic ring having its ends joined by the T, a swivel clamp over the hole, a transparent plastic leg slipped into the clamp, a ferrule on the bottom of the leg, and a plurality of ball mounted swivel nozzles pressed into holes in the upper face of the ring.

BACKGROUND OF THE INVENTION

This invention pertains to apparatus for creating ornamental displays, useful for decorating the home, yard, office and other areas and for advertising, and more particularly to fountains.

Apparatuses of this type have been known heretofore but they have been heavy, bulky, expensive and difficult to ship. It is an object of the invention to overcome these difficulties. In addition, it is an object of the invention to provide a knockdown fountain that presents a more beautiful display and one of a pattern that can be easily adjusted and which can be adapted readily to fit different surroundings. A further object of this invention is to provide a fountain that can easily be cleaned.

Other objects and advantages of the invention will appear from the following description of a preferred embodiment thereof reference being made to the accompanying drawings.

BRIEF DESCRIPTION OF DRAWINGS

FIGURE 4 is a perspective of the fountain display apparatus of FIGURES 1–3 with decorations and water removed, showing the electrical connections; the apparatus being adapted for a shallow pool;

FIGURES 5 and 6 are perspectives of the fountain display apparatus as adapted for medium depth and deep pools;

FIGURE 7 is a perspective view of the fountain display apparatus, except the pump being omitted, similar to FIGURE 6 but to a larger scale;

FIGURE 8 is an exploded view of the apparatus of FIGURE 6;

FIGURE 9 is a bottom perspective view of the fountain ring adapted for packaging;

FIGURE 10 is a perspective detail of the swivel clamp;

FIGURE 11 is an exploded axial section through a nozzle;

FIGURE 12 is an exploded detail showing a fragment of the fountain ring and a nozzle; and FIGURE 13 is a view similar to FIGURE 11 showing the nozzle and ring assembled.

SUMMARY OF THE INVENTION

To achieve different display patterns, a fountain ring has nozzles mounted on ball and socket joints. To facilitate cleaning, the ring has a blowout hole opposite its inlet, the hole normally being covered by a clamp that connects to a support leg. An inlet T can swivel flat for packaging. The nozzles are hand press fitted into the ring and can be removed for packaging. A riser pipe connecting the ring to a pump is of jointed construction so that by removing joints the ring can be lowered for shallow pools. The support leg is of readily sawn material so it too can be adapted to shallow pools. The angle of the support leg can be adjusted by means of the swivel clamp to care for minor height adjustments. The primary support for the ring is through the riser pipe connected to the relatively heavy pump.

DESCRIPTION OF PREFERRED EMBODIMENT

Figure 1:
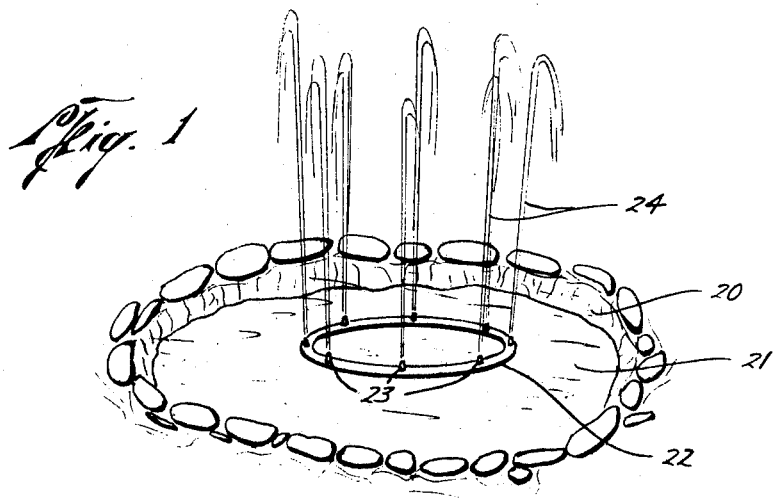
FIGURES 1, 2 and 3 are perspectives of fountain display apparatus embodying the invention, showing different spray patterns.
Figure 2:
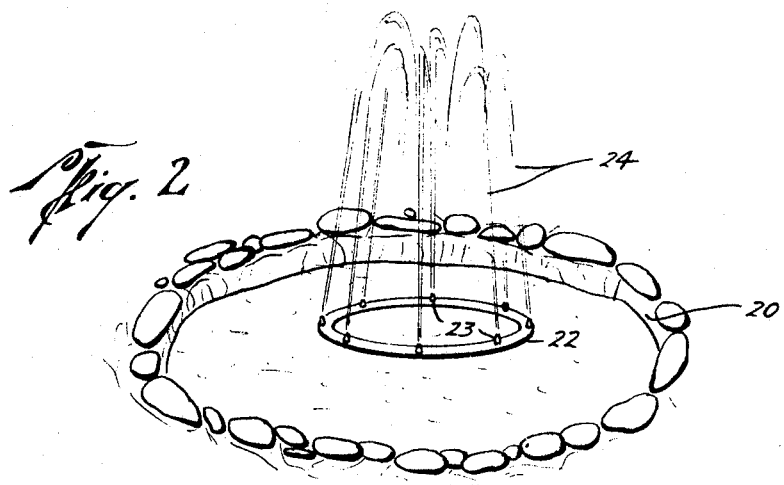
Figure 3:
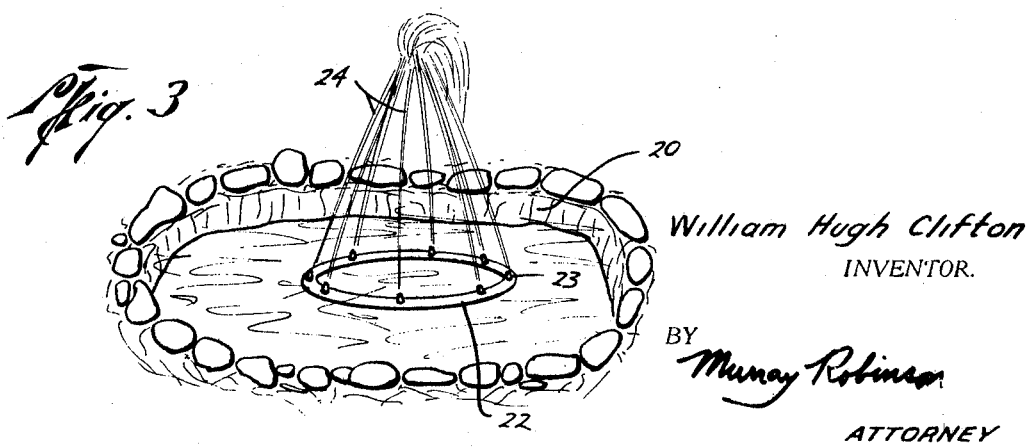

Referring to FIGURES 1, 2, and 3, there is shown a fountain including basin 20 in which there is a pool of water 21. Adjacent the water surface is fountain ring 22 with a plurality of nozzles 23 spraying water jets 24 upwardly and outwardly. FIGURE 2 shows the same fountain as FIGURE 1 except that the nozzles are adjusted so that the jets are inclined inwardly. FIGURE 3 shows the same fountain except that the nozzles are adjusted so that the jets intersect.

Referring to FIGURE 4, there is shown basin 20 formed by placing a plastic sheet in a depression in the ground. An underground electric power supply terminates in an above ground outlet 31 to which is plugged cable 32 leading to submersible electric driven pump 33 resting on the bottom 34 of the basin. The fountain ring 22 is connected to the pump by riser pipe 40.

Referring to FIGURES 5 and 6, it is seen that the height of the ring 22 above the bottom of the basin can be changed by incorporating in the riser pipe 40 one or more joints in addition to that forming the pump outlet. For example one additional joint 41 is used in FIGURE 5 and two additional joints 41, 42 are used in FIGURE 6. The support leg is preferably made of transparent material so as to be invisible. A transparent plastic provides a suitable strong material that can easily be sawn, e.g. nylon or methyl methacrylate.

Referring to FIGURE 7, the leg 43 has a plastic ferrule 50 hand press fitted to the lower end thereof to provide a wider footing. The upper end of the leg is hand press fitted into a socket 43′ in the lower side of clamp 44. The tubular joints 41 and 42 of the water riser pipe 40 are connected to each other and to the pump by threaded tubular couplings 51, 52. The upper joint 41 is screwed into the vertical portion 53 of pipe T 54. The other ends of the pipe T are pressed into the adjoining ends of the fountain ring 22. The ring is made of resilient plastics material which preferably has a relaxed, unstressed major diameter larger than that of the ring but which is bent to bring the ends 55, 56 into engagement with the T ends. The T ends have annular beads 60, 61 therearound (see FIGURE 9) to fit tightly in the ends of the ring and retain same in position.

As shown in FIGURE 8, the nozzles 23 are insertable and removable relative to a plurality of holes 62 in the top of the fountain ring. The clamp 44 is removable by unscrewing screw 63. FIGURE 8 also shows the upstanding outlet pipe 64 of submersible pump 33 to which the remainder of the riser piper 40 is connected. For shallow pools, the riser pipe 40 consists solely of the outlet pipe 64 to which vertical portion 53 of T 54 is connected directly. For shipping, all of the parts shown separated in FIGURE 8 are disconnected. Then the T 54 is swivelled to a position coplanar with the ring as shown in FIGURE 9.

FIGURE 9 also shows the blowout hole 70 in the bottom of the ring 27. Whenever this hole is uncovered, i.e., whenever the combination closure and socket clamp 44 is removed or positioned so as not to cover the hole 70, water or other fluid entering the ring through T 54 will blow out the dirt in the ring through hole 70. FIGURE 10 shows to a larger scale how combined socket and closure clamp 44 covers hole 70 during normal operation of the apparatus.

The details of the adjustable nozzles are shown in FIGURE 11. Each nozzle includes a director 70 and a connector 71. The director has a tip 72 with a small diameter passage 73 therethrough and a base 74 with a socket 75 therein, there being an annular lip 76 at the lower edge of the base. The socket 75 is adapted to receive ball 80 at the upper end of the connector 71, the diameter of ball 80 being somewhat larger than that of lip 76 so as to be received with a snap fit, both the director and connector being made of resilient plastics material. Around the midportion of the connector is an annular flange 81 and the lower part of the connector is a tube 82 having a plurality of circumferentially spaced radial lugs 83 thereon. There is an axial passage 84 through the director.

As shown in FIGURES 12 and 13, each nozzle 23 is adapted to be pressed into a hole 62 in ring 22, the lugs 83 deforming sufficiently to allow entrance of tube 82 into the hole 62 and then, when the tube has been pushed in far enough, to spring out behind the wall of ring 22 to retain the nozzle. Or the lugs may merely remain compressed with the walls of hole 62 making a tight friction fit. The flange 81 rests against the outside of ring 22 and provides lateral stability.

There is sufficient clearance so that director 70 can be rotated relative to connector 71 to direct the jets emerging from the nozzle inwardly, outwardly, or circumferentially relative to the ring, some possible spray patterns being shown in FIGURES 1, 2, and 3.

In operation, the recirculating pump takes water from the pool 21 and directs it up through the riser pipe 40

What is claimed is:

1. A knockdown fountain display apparatus comprising an open ended resilient plastics material tubular ring, a pipe T joining the ends of the ring but free to swivel therein, said ring having a plurality of apertures in the upper face thereof, a plurality of nozzles received in said apertures in said ring, each nozzle including a connector having a tube pressed into one of said apertures and having a ball connected to the tube, each nozzle further including a director having a socket receiving the ball and a tip with a passage of smaller diameter than the inside tube diameter of the ring, the axis of said director bring adjustably directed relative to the axis of said tube.

2. Combination of claim 1 wherein said ring has a blowout hole in its underface opposite said T, and including a combination leg support socket and closure releasably clamped over the blowout hole.

3. Combination of claim 2 including a leg of sawable transparent material pressed into said socket and a jointed riser pipe connected to said T.

4. Combination of claim 3 including a ferrule pressed onto the free end of said leg and submersible pump having a vertical outlet pipe forming part of said riser pipe.

5. Combination of claim 4 including a basin, a pool of water in the basin, said pump and ferrule being supported by the basin with the ring adjacent the surface of the water and the nozzles extending thereabove, and electric power means driving said pump to circulate water from the pool through the pump up the riser pipe to the ring and out the nozzles where it falls back to the pool.

References Cited

UNITED STATES PATENTS

| | | | |
|---|---|---|---|
| 876,453 | 1/1908 | Heard | 239—550 X |
| 1,087,006 | 2/1914 | Fitzsimons | 239—587 |
| 2,816,799 | 12/1957 | English | 239—587 X |
| 2,974,871 | 3/1961 | Naythons | 239—23 |
| 3,008,649 | 11/1961 | Bock et al. | 239—550 X |
| 3,046,698 | 7/1962 | Breen et al. | 285—61 |

M. HENSON WOOD, JR., Primary Examiner

THOMAS C. CULP, JR., Assistant Examiner

U.S. Cl. X.R.

239—547, 550, 567, 587

PO-1050
(5/69)

UNITED STATES PATENT OFFICE
CERTIFICATE OF CORRECTION

Patent No. 3,503,554　　　　　　　　　Dated March 31, 1970

Inventor(s) WILLIAM HUGH CLIFTON

It is certified that error appears in the above-identified patent and that said Letters Patent are hereby corrected as shown below:

Col. 3, line 35, after "pipe 40" insert -into the ring 22 from which it is discharged through nozzles 23 and falls back into the pool.-
Claim 1, cancel lines 2 and 3; last line of claim 1, change "bring" to -being-.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents